(12) United States Patent
Wellbaum et al.

(10) Patent No.: US 7,016,357 B1
(45) Date of Patent: Mar. 21, 2006

(54) METHODS AND APPARATUS FOR ARBITRARY CONCATENATION IN A SWITCH

(75) Inventors: Tom Q. Wellbaum, Beaverton, OR (US); Daniel E. Klausmeier, Menlo Park, CA (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 09/427,300

(22) Filed: Oct. 26, 1999

(51) Int. Cl.
*H04L 12/56* (2006.01)
(52) U.S. Cl. ............... 370/395.51; 370/474; 370/475; 370/907
(58) Field of Classification Search ............ 370/395, 370/907, 376, 510, 503, 506, 509–512, 516–517, 370/470–476, 395.53, 395.62, 532–545
See application file for complete search history.

(56) References Cited

U.S. PATENT DOCUMENTS

| | | | |
|---|---|---|---|
| 5,257,261 A * | 10/1993 | Parruck et al. | 370/522 |
| 5,329,524 A * | 7/1994 | Paker et al. | 370/370 |
| 5,361,255 A * | 11/1994 | Diaz et al. | 370/374 |
| 5,416,772 A * | 5/1995 | Helton et al. | 370/376 |
| 5,461,622 A * | 10/1995 | Bleickardt et al. | 370/470 |
| 5,485,298 A * | 1/1996 | Haas | 359/139 |
| 5,537,405 A * | 7/1996 | Yoshifuji | 370/536 |
| 5,568,486 A * | 10/1996 | Huscroft et al. | 370/395.2 |
| 6,058,119 A * | 5/2000 | Engbersen et al. | 370/466 |
| 6,118,795 A * | 9/2000 | Fukunaga et al. | 370/503 |
| 6,147,968 A * | 11/2000 | De Moer et al. | 370/225 |
| 6,266,333 B1 * | 7/2001 | Kartalopoulos | 370/395.53 |
| 6,526,069 B1 * | 2/2003 | Wolf et al. | 370/503 |

OTHER PUBLICATIONS

Yukio Nakano, et al., "Signal Processing for SDH Digital Cross-Connect System", IEEE International Conference on Communications, vol. 2, pp. 900-904, 1999.*
PCT, "International Search Report".
PCT, "Written Opinion".
PCT, "International Preliminary Examination Report".

* cited by examiner

*Primary Examiner*—Brian Nguyen
*Assistant Examiner*—Tri H. Phan
(74) *Attorney, Agent, or Firm*—Dougherty Clements; Christopher L. Bernard; Tyler S. Brown

(57) ABSTRACT

Switch frames are arbitrarily concatenated to allow for any available time slots to be used for carrying concatenated switch frames. Methods and apparatus transport switch frames in available time slots, and keep track of which time slots correspond to a group of concatenated switch frames. The switch frames are transported through the switch and synchronized on the outgoing side of the switch so that arbitrarily concatenated switch frames are synchronized with each other.

27 Claims, 11 Drawing Sheets

|           |    |    |    |
|-----------|----|----|----|
| OC-3c #1  | 1  | 17 | 33 |
| OC-3c #2  | 2  | 18 | 34 |
| OC-3c #3  | 3  | 19 | 35 |
| ⋮         |    |    |    |
| OC-3c #16 | 16 | 32 | 48 |

Fig. 2
Prior Art

| | | | | | | | | | | | | |
|---|---|---|---|---|---|---|---|---|---|---|---|---|
| OC-12c #1 | 1 | 2 | 3 | 4 | 17 | 18 | 19 | 20 | 33 | 34 | 35 | 36 |
| OC-12c #2 | 5 | 6 | 7 | 8 | 21 | 22 | 23 | 24 | 37 | 38 | 39 | 40 |
| OC-12c #3 | 9 | 10 | 11 | 12 | 25 | 26 | 27 | 28 | 41 | 42 | 43 | 44 |
| OC-12c #4 | 13 | 14 | 15 | 16 | 29 | 30 | 31 | 32 | 45 | 46 | 47 | 48 |

Fig. 3
Prior Art

|  | CAT_IND | STS_ID |
|---|---|---|
| PARENT 0 | 0 | |
| | | |
| CHILD 1 4 | 1 | 0 |
| | | |
| CHILD 2 6 | 1 | 0 |
| | | |
| 47 | | |

METHODS AND APPARATUS FOR ARBITRARY CONCATENATION IN A SWITCH

BACKGROUND OF THE INVENTION

The present invention relates to methods and apparatus for implementing arbitrary concatenation of frames conforming to a synchronous optical network (SONET) standard.

SONET has been adopted as a standard protocol for fiber optic transmission, whereby data is transmitted as a series of time slots or frames. Higher data rate SONET transmissions multiplex more frames than lower rate transmissions. The lowest SONET data rate transmission, however, transmits at a base rate of 51.84 Mbit/second. Frames associated with this fundamental SONET transmission are referred to as synchronous transport signal level one (STS-1) in the electrical domain, and the corresponding optical signal is referred to as an OC-1.

Higher data rate SONET frames are formed of integer multiples of STS-1s, and have designations STS-N, OC-N for the corresponding optical signals, where N is 3, 12, etc. Each OC level has a corresponding data transfer rate that is a multiple of the base rate. OC-3, for example, runs at three times the base rate.

As seen in FIG. 1, one such high speed SONET signal, OC-48, includes 48 STS-1 frames, when converted to corresponding electrical signals. Each STS-1 frame is transmitted during a respective time slot, and comprises two components: transport overhead and payload. Transport overhead is provided in 9 rows of three bytes each (27 bytes total), and carries administrative information used by network entities to manage the transfer of the frame through the network. The payload, referred to as the Synchronous Payload Envelope (SPE), is provided in 9 rows of 87 bytes each (783 bytes total) and comprises the major portion of an STS-1. The SPE carries payload and STS Path Overhead (STS POH) bytes, and may begin at any byte location within the payload envelope, as indicated by a pointer value in the overhead.

Certain broadband transmission protocols (e.g., ATM and ISDN), however, include relatively large payloads which do not fit within a single STS-1. Thus, in order for these protocols to be transmitted over SONET, a plurality of STS-1 s are concatenated together. Such concatenated STS-1 are referred to as STS-Nc, and are multiplexed, switched and transported as a single unit. The SPE of an STS-Nc includes N×783 bytes, which may be considered as an N×87 column×9 row structure. Only one set of STS POH is used in the STS-Nc, with the pointer always appearing in the transport overhead of the first of the N STS-1 s that make up the STS-Nc.

The SONET standard, however, requires that the STS-1s that make up an STS-Nc occupy specific time slots. For example, FIG. 2 illustrates 48 time slots occupied by 16 OC-3cs transmitted within an OC-48 frame. In particular, as seen in FIG. 2, OC-3c #1 must occupy a "row" of time slots 1, 17 and 33, OC-3c #2 must occupy time slots 2, 18, and 34, and OC-3c #16, must occupy time slots 16, 32, and 48. In order to add a new OC-3c, one entire row shown in FIG. 2, must be removed or reallocated.

FIG. 3 illustrates specific time slots occupied by four OC-12cs within an OC-48 frame. Specifically, OC-12c #1 must occupy time slots 1–4, 17–20, and 33–36, OC12-c #2 must occupy time slots 5–8, 21–24, and 37–40, and OC-12c #4 must occupy time slots 13–16, 29–32 and 45–48. Likewise, in order to add a new OC-12c, an entire row shown in FIG. 3 must be removed or reallocated.

If time slots 1, 2 and 3 are dropped in the OC-48 frame shown in FIG. 3, and populated with data for an OC-3c, however, they could not be switched by current SONET equipment because they are not transmitted in a sequence conforming to the concatenation protocol described above. Rather, a conventional SONET network element would need to be reconfigured to thereby rearrange the remaining time slots so that a new OC-48 frame is created which does conform to the standard concatenation sequence. If reconfiguration is not performed, the empty time slots cause bandwidth fragmentation.

Reconfiguring SONET network elements, however, requires substantial down time causing disruption in the flow of data through a network. Thus, there is a need for a network element, such as a switch, which can arbitrarily concatenate time slots associated with an OC frame which are not provided in a given "row" or sequence required by SONET.

SUMMARY OF THE INVENTION

Systems and methods consistent with the principles of the present invention provide arbitrary concatenation without having to reorganize a switch to have particular time slots for each OC-Nc.

Further, consistent with the present invention, a network element is provided comprising a switch configured to receive a first plurality of optical signals. The first plurality of optical signal are grouped into a plurality of time slots, with selected ones of the plurality of time slots being concatenated. The plurality of optical signals conform to a synchronous optical network (SONET) standard, except a sequence of the plurality of concatenated time slots being non-conforming with said SONET standard. The switch is also configured to output a second plurality of optical signals corresponding to the first plurality of optical signals.

Both the foregoing general description and the following detailed description explain examples of the invention and do not, by themselves, restrict the scope of the appended claims. The accompanying drawings, which constitute a part of this specification, illustrate apparatus and methods consistent with the invention and, together with the description, help explain the principles of the invention.

BRIEF DESCRIPTION OF THE DRAWINGS

The accompanying drawings, which are incorporated in and constitute a part of this specification, illustrate embodiments of the invention and, together with the description, serve to explain the advantages of the invention. In the drawings.

FIG. 2 illustrates the requirement imposed by SONET that concatenated time slots must occupy particular time slots;

FIG. 3 is a second illustration of the requirement imposed by SONET that concatenated time slots must occupy particular time slots;

FIG. 11 is a block diagram illustrating an embodiment of a Tx concatenation table 1310 that maps parent-child relationships for STS-1's.

DETAILED DESCRIPTION OF THE INVENTION

The following detailed description refers to the accompanying drawings. The same reference numbers in different drawings identify the same or similar elements. Also, the following detailed description does not limit the invention. Instead, the scope of the invention is defined by the appended claims.

As noted above, concatenated time slots include a first time slot including pointer information, and subsequent time slots lacking such pointer information. Conventional SONET switching equipment sense concatenation indicators of the subsequent time slots, and based on the sequence in which these subsequent time slots are received, use the pointer of the first time slot as the pointer for the remaining time slots of the concatenated series. Once the pointer is known, a switch can properly route the received data without data loss.

As further noted above, if the concatenated time slots do not arrive at the switch in the precise sequence required by SONET, i.e., the time slots are arbitrarily concatenated, the switch cannot determine the correct pointer information, and thus, cannot properly route the data. Consistent with the present invention, however, a switch is provided that receives concatenated time slot identification data, typically from an external source. Based on this information, circuitry within the switch determines the pointer location within each of the concatenated time slots, and performs the required switching operations even if the time slots are arbitrarily concatenated. Moreover, the present invention can switch any suitable number of concatenated time slots, not just OC-3c and OC-12c, but OC-2c, OC-4c, etc.

Figure 1:
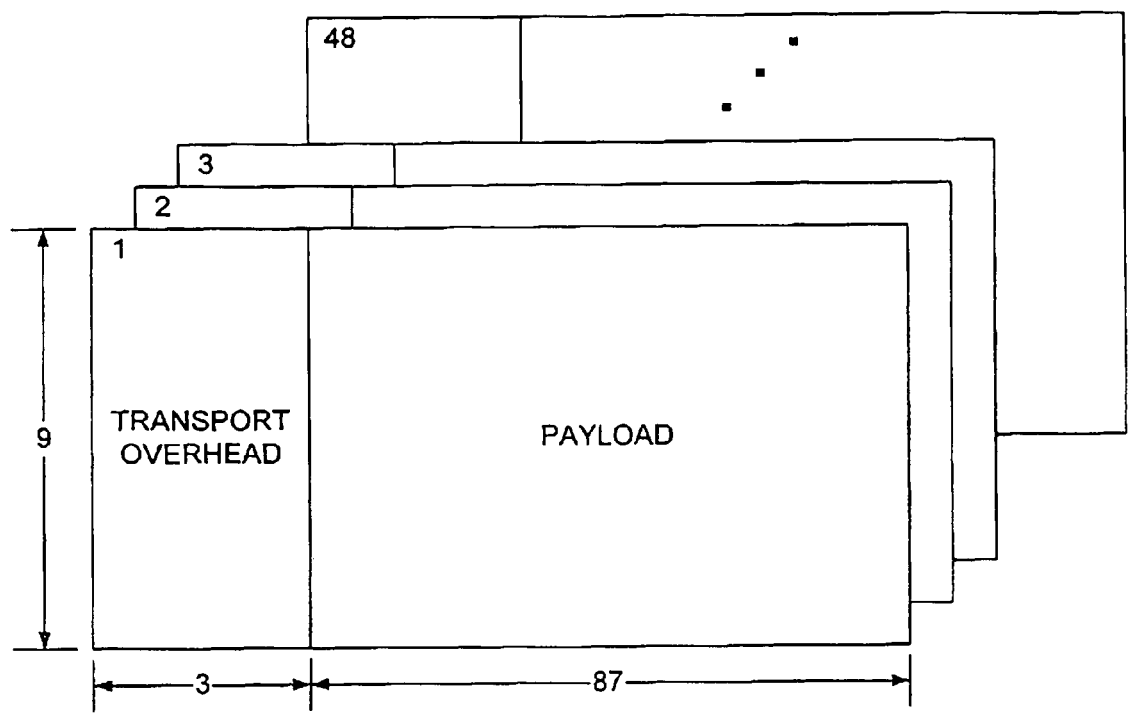
FIG. 1 shows 48 conventional STS-1 frames.
Figure 4:
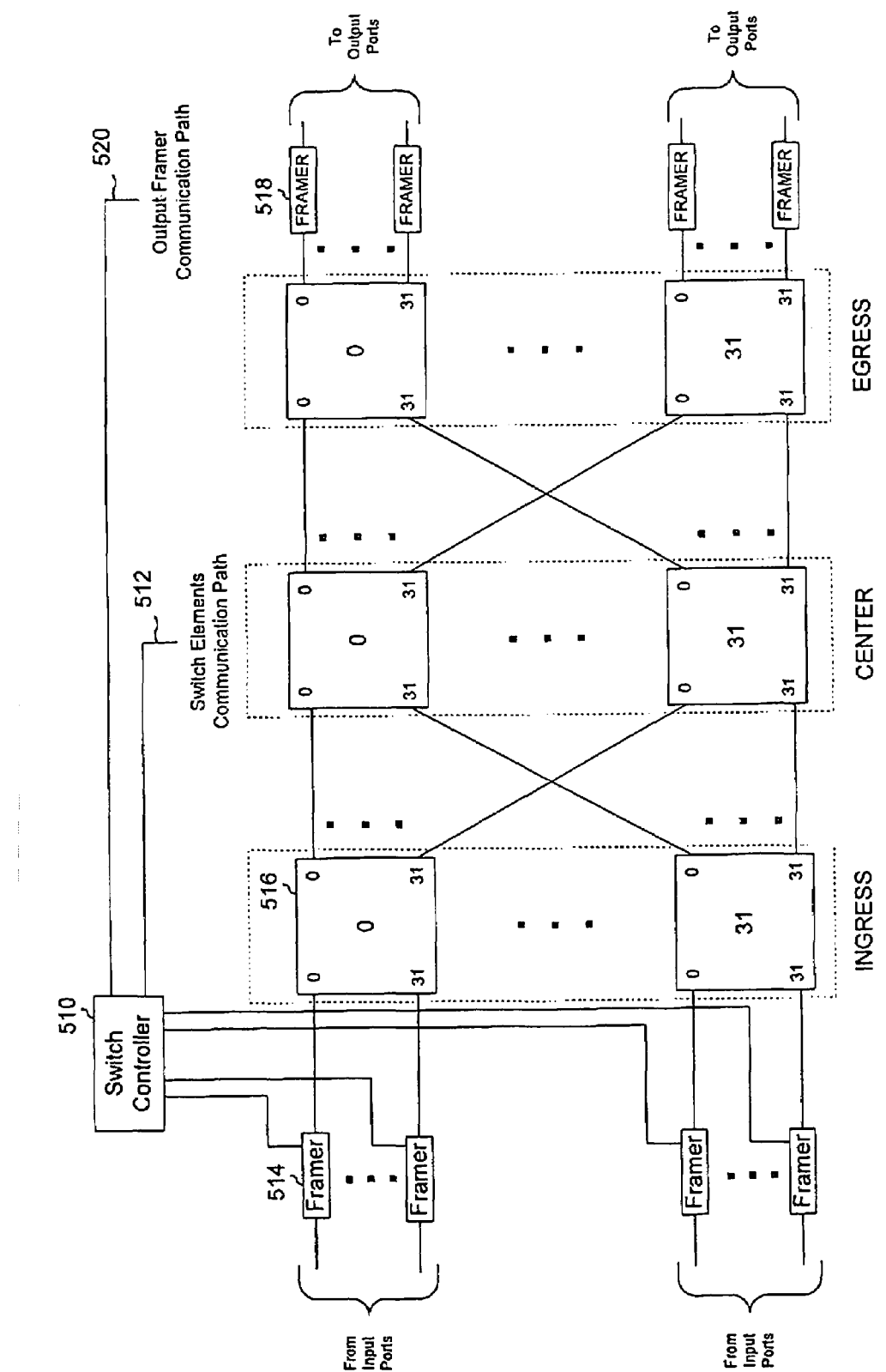
FIG. 4 shows an embodiment of a switch consistent with the principles of the present invention.

FIG. 4 shows an embodiment of a switch that may be used to perform arbitrary concatenation consistent with the principles of the present invention. The switch has three stages: an ingress stage, a center stage, and an egress stage. In this embodiment, each stage has n switch elements, numbered 0 to n−1, and each switch element has n input ports and n output ports, where n is an integer.

The inputs to the ingress stage are connected to input framers of the switch and the outputs of the egress stage are connected to output framers of the switch. Each ingress switch element output is connected by a bus to a respective center stage switch element. Similarly, each center stage element output is connected by a bus to an input of a respective egress element.

The buses entering the switch, between stages, and leaving the switch are time-division multiplexed to carry an appropriate number of time slots. A switch element is capable of connecting any switch element input to any output, and of mapping any time slot on any input port to any time slot on any output port. Data entering the switch is typically converted from SONET frames into internal switch frames including switch control information and several time slot groups containing data, as described for example in copending U.S. patent application Ser. No. 09/421,059 entitled "A SWITCH MATRIX ARCHITECTURE AND TECHNIQUES FOR IMPLEMENTING RAPID HITLESS SWITCHOVER", filed on Oct. 19, 1999, which is incorporated by reference herein.

Each input time slot can be further time division multiplexed into m further time slots. Thus, since each switch element has n inputs and n outputs, and each line includes m time-division multiplexed time slots, each switch element is effectively an nxm switch element.

Each switch element in the ingress stage receives inputs from a respective framer. For example, as illustrated in FIG. 4, the 0 input of ingress switch element 0 receives information from framer 514. Framer 514 typically receives SONET frames from the input ports of the switch and converts the SONET frames into the internal switch frame format. Framer 514 communicates information regarding the incoming SONET frames to switch controller 510, and receives control information from switch controller 510.

Switch controller 510 receives information from the switch elements and transmits information to the switch elements over communication path 512 to control the overall operation of the switch. Switch controller 510 can also interface with a system administrator to supply, via communication path 520, time slot concatenation information to each output framer circuit, such as output framer 518. The time slot concatenation information will be described in greater detail below.

Figure 5:
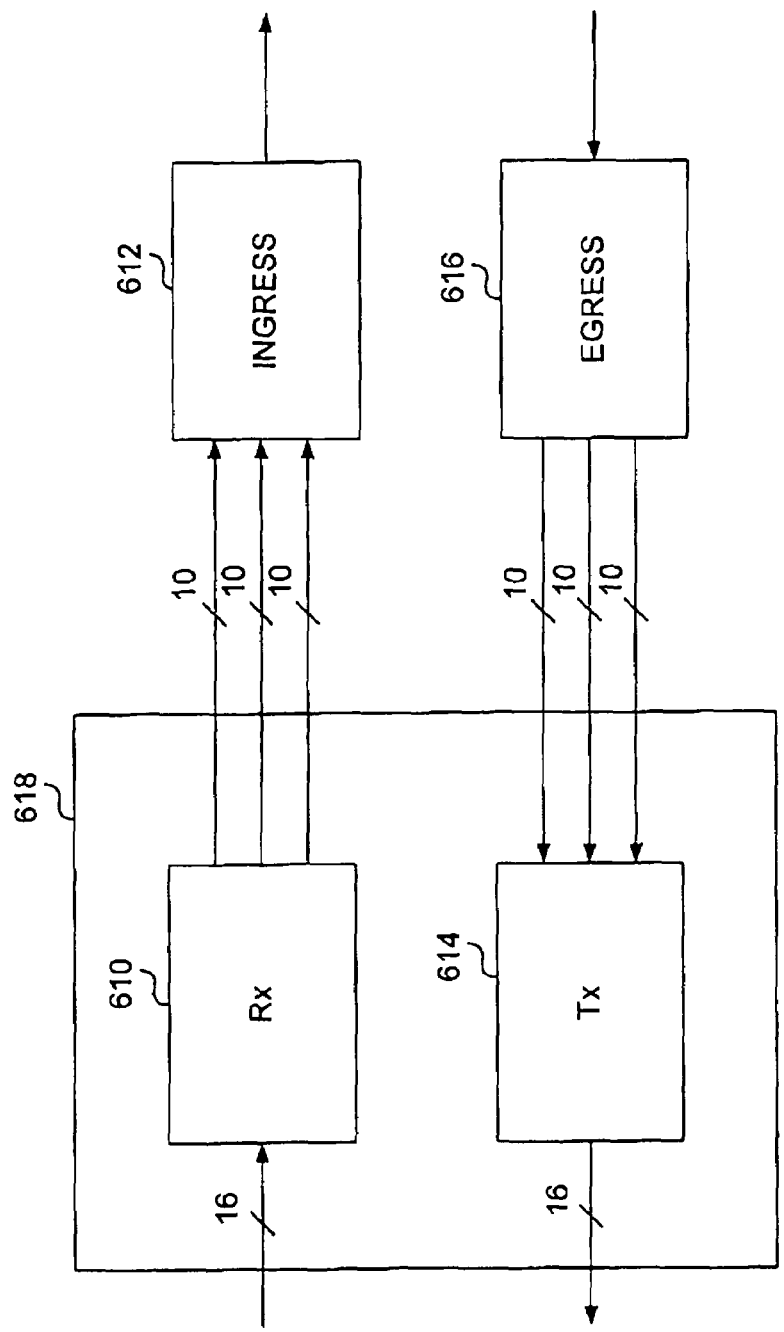
FIG. 5 is a block diagram illustrating a framer 618 that implements arbitrary concatenation methods and apparatus consistent with the invention.

FIG. 5 is a block diagram illustrating a framer 618 that implements arbitrary concatenation methods and apparatus consistent with the invention. Framer 618 implements an input and output framer pair, as shown in FIG. 4. For example, framer 618 may implement input framer 514 and output framer 518.

Framer 618 is comprised of an input circuit, Rx stage 610, and an output circuit, Tx stage 614. In one embodiment, Rx stage 610 receives data from a 16-bit bus, and outputs data to ingress stage 612 on three 10-bit buses. In one embodiment, the 16-bit bus carries SONET frames received from an optical interface and multiplexed onto the 16-bit bus. Rx stage 610 takes the data from the payload of each SONET frame, loads the data into internal frames having an appropriate internal frame format, and transmits them to ingress stage 612.

Figure 6:
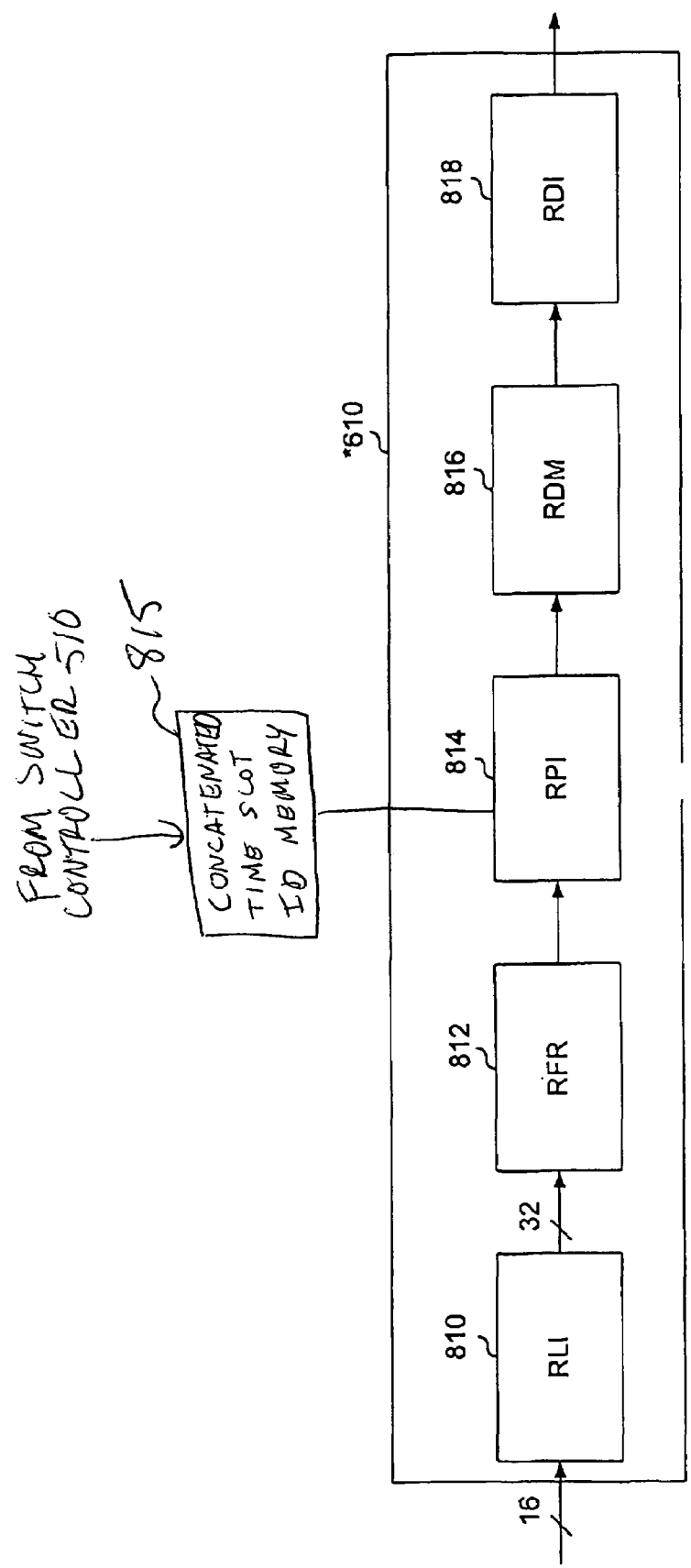
FIG. 6 is a block diagram illustrating Rx stage 610.

FIG. 6 is a block diagram illustrating Rx stage 610 in greater detail. Rx stage 610 is comprised of receive line information element (RLI) 810, receive framer (RFR) 812, a pointer determining circuit or receive pointer interpreter (RPI) 814, receive data memory (RDM) 816, and receive dropside information element (RDI) 818. RLI 810 receives data over the 16-bit bus and reformats the data to 32 bits, for example. RFR 812 receives the 32-bit data, and byte-aligns and frame-aligns the incoming data. The byte- and frame-aligned data is then transferred to RPI 814.

Figure 8:
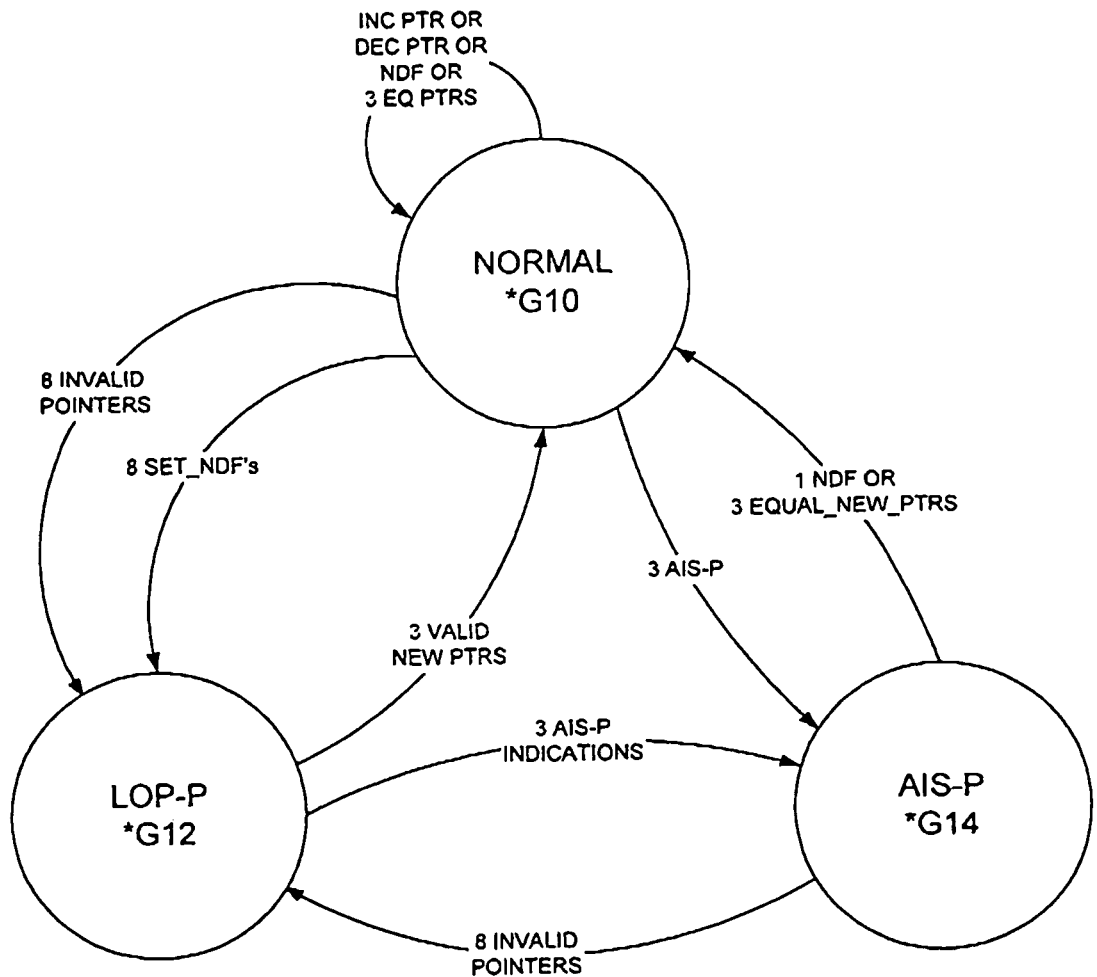
FIG. 8 is a state diagram illustrating the operation of RPI 814, consistent with SONET.

FIG. 8 is a state diagram illustrating the operation of RPI 814, consistent with SONET. RPI 814 has three states: normal 1010, loss of pointer (LOP-P) 1012, and alarm indication state (AIS-P) 1014. RPI 814 stays in normal state 1010 as long as one of increment pointer (INC PTR), decrement pointer (DEC PTR), new data flag (NDF), or three equal pointers (3 EQ PTRS) occurs. If eight invalid pointers are received or if eight set NDF's, then RPI 814 moves to LOP-P state 1012.

From LOP-P state 1012, RPI 814 moves to normal state 1010 upon receiving an indication that three valid pointers have been received (3 VALID NEW PTRS). RPI 814 moves from LOP state 1012 to AIS-P state 1014 upon receiving three AIS-P indications (3 AIS-P INDICATIONS).

From AIS-P state 1014, RPI 814 moves to normal state 1010 upon receiving an indication that one NDF (1 NDF) or three equal new pointers (3 EQUAL_NEW_PTRS) are received. RPI 814 moves from AIS-P state 1014 to LOP-P state 1012 upon receiving an indication that eight invalid pointers have been received (8 INVALID POINTERS).

Figure 7:
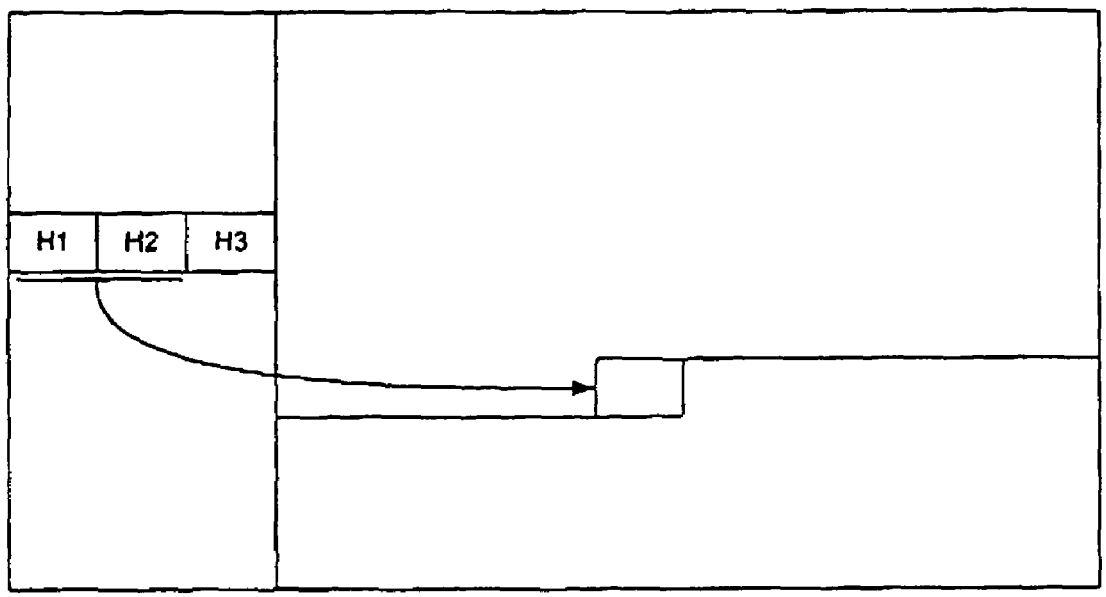
FIG. 7 illustrates how the transport overhead carries information defining where the data in the payload begins.

RPI 814 performs pointer interpretation on both concatenated and non-concatenated time slots. FIG. 7 illustrates a pointer in the transport overhead that defines where data begins in the payload. As is generally understood, the transport overhead includes H1, H2, and H3 bytes. The H1 and H2 bytes provide a pointer having a value defining the start of the payload of the STS-1, as indicated by the arrow in FIG. 7. Pointers are generally used to compensate for variations between rates of incoming data supplied to the switch and outgoing data from the switch. For example, RPI 814 can use pointer information to insert extra payload bytes (also commonly referred to as "negative byte stuffing") or remove payload bytes (also commonly referred to as "positive byte stuffing"), as required, so that SONET frames are input to and output from the switch at the same rate.

For non-concatenated time slots, RPI 814 performs conventional pointer processing. In the case of arbitrarily concatenated frames, however, RPI 814 accesses a memory 815 containing concatenated time slot identification in order to determine the pointer associated with each of the concatenated time slots. Two sub-memories or tables are provided in memory 815, the contents of which will next be described, by way of example, with reference to FIGS. 9(*a*) to 9(*c*).

Figure 9A:
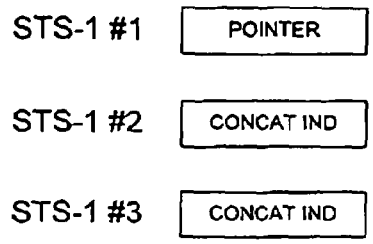
FIGS. 9(a), 9(b), and 9(c) are block diagrams that illustrate how RPI 814 of FIG. 6 performs arbitrary concatenation.
Figure 9B:
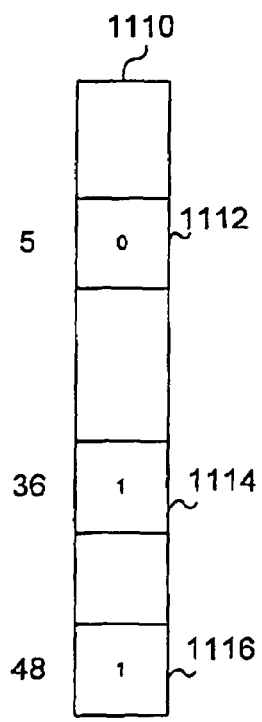
Figure 9C:
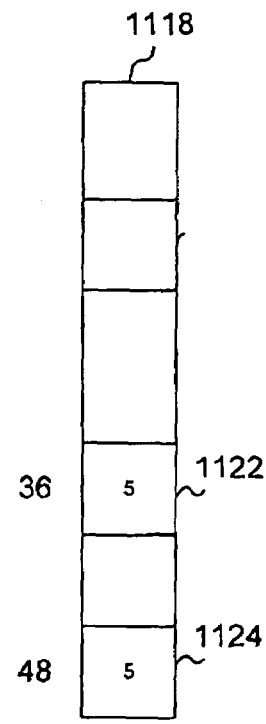

FIG. 9(*a*) illustrates an OC-3c having three STS-1's. As noted above, in SONET, each STS-1 of and OC-3c would be required to be located in three particular time slots of the 48 available time slots (see FIG. 2). With arbitrary concatenation, however, the three STS-1's may not be in particular time slots. Therefore, a mechanism is needed to determine which three STS-1's comprise an OC-3c. In particular, the first STS-1 ("parent") of the concatentated time slots is identified, and its pointer is used as the pointer for the remaining concatenated STS-1 time slots ("children"). From this, the pointer for the OC-Nc group of time slots can also be determined. Typically, the pointer is defined by the parent of the particular arbitrarily concatenated OC-Nc.

In FIG. 9(*a*), STS-1#1 is the parent and contains the pointer, and STS-1#2 and STS-1#3 are children and therefore contain concatenation indicators, indicating they have a parent. If an STS-1 has a concatenation indicator, RPI 814 must obtain the pointer value from the parent. In the example shown in FIG. 10(*a*), RPI 814 obtains the pointers for children STS-1#2 and STS-1#3 from parent STS-1#1.

FIG. 9(*b*) illustrates the first sub-memory, parent/child register 1110, contained within memory 815. Parent child register 1110 receives data from switch controller 510 defining which STS-1's are parents and which are children. Parent/child register 1110 is comprised of 48 one-bit locations respectively corresponding to each STS-1. Parent/child register 1110 is typically used if the STS-1 s are transmitted as part of an OC-48 frame. If other frames are transmitted, e.g., OC-N, N one-bit locations are used. The value of each bit indicates whether the corresponding STS-1 is a parent or a child. Typically, a "0" indicates a parent, and a "1" indicates a child. In the example shown in FIG. 10(*b*), the bit corresponding to STS-1#5 contains a "0," indicating a parent, the bit for STS-1#36 contains a "1," indicating a child, and the bit corresponding to STS-1#48 contains a "1" as well, indicating a child. Memory locations corresponding to other non-concatenated time slots also store a "0". Accordingly, a second memory table, parent ID register 1118, is used to specifically identify the parent for a given child.

FIG. 9(*c*) illustrates a second sub-memory, parent ID register 1118, for maintaining the ID for each parent. Parent ID register 1118 also receives data from switch control circuit 510, and is comprised of 48 storage locations respectively corresponding to each STS-1 of an OC-48 frame. If, for example, an OC-192 frame is transmitted, Parent ID register 1118 would include 192 storage locations. Those memory locations corresponding to child time slots store data indicating their respective parent time slot. Thus, for example, storage location 36 stores the value 5, indicating that time slot 36 is a child, and time slot 5 is its parent. In addition, storage location 48, also stores the value 5, thereby indicating that time slot 5 is the parent of time slot 48 as well. Therefore, based on the contents of sub-memories 1110 and 1118, RPI 814 determines which time slot is a parent, and which slots are the associated children. RPI 814 then extracts the pointer value from the parent time slot and uses it for each of the corresponding children. As a result, the pointer for each concatenated time slot can be obtained.

Returning to FIG. 6, pointer information output from RPI 814 is supplied to RDM 816, which acts as a first-in first-out (FIFO) buffer to store data received from RPI 814. The pointer information is used to synchronize the time slots stored in the FIFO and perform byte stuffing. Next, the time slots are fed to RDI 818, where they are modified to have the above-described internal frame format. RDI 818 receives signals (not shown), such as frame synchronization signals and timing signals that determine when a frame will be launched from Rx stage 610 to ingress stage 612, thereby insuring that the internal frames enter the switched fabric in a synchronized manner.

Rx stage 610 handles the frames coming into the switch and transferred to the switch fabric. As frames come out of the switch fabric, they are handled by Tx stage 614.

Figure 10:
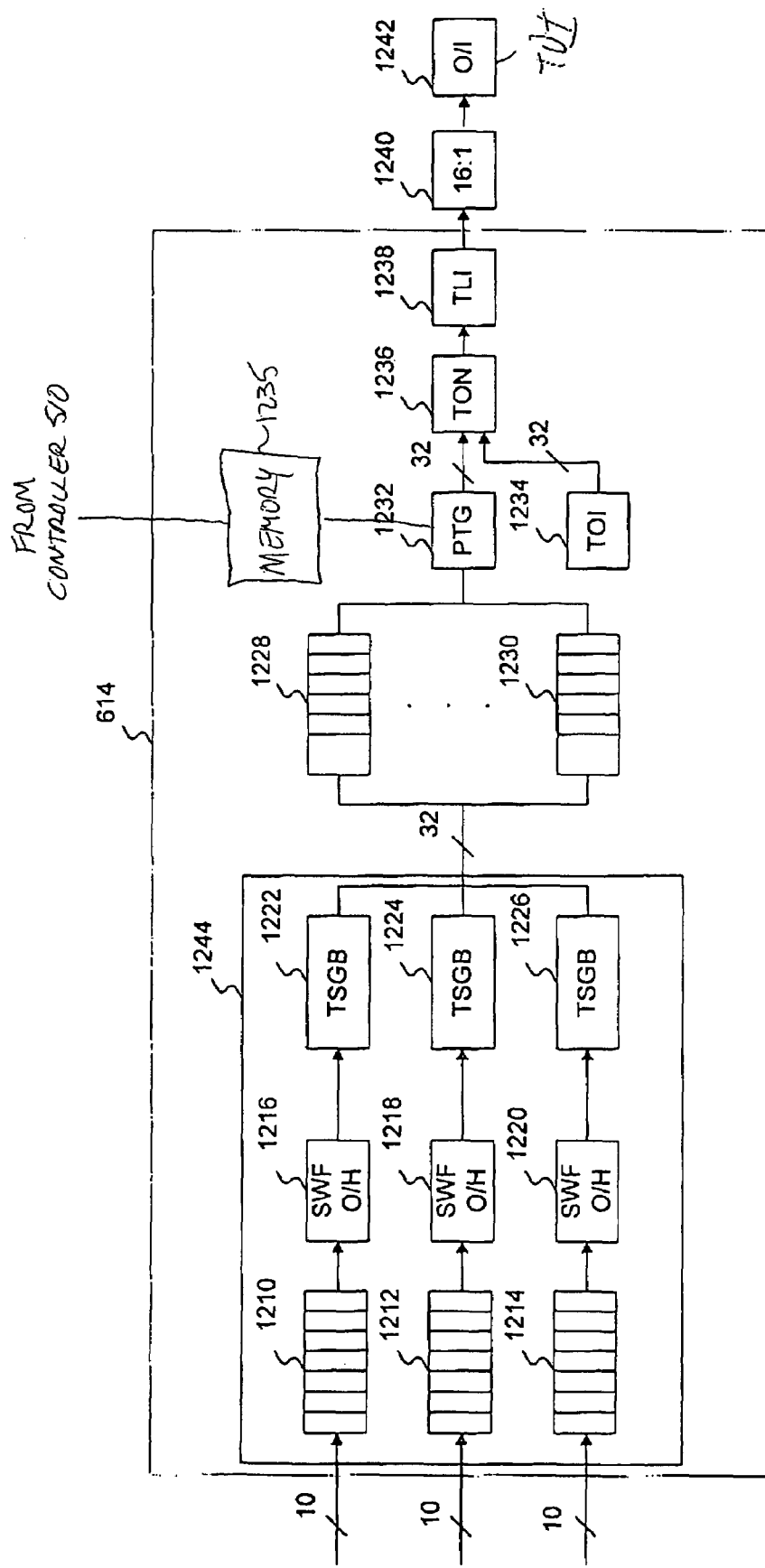
FIG. 10 is a block diagram of an embodiment of Tx stage 614 of FIG. 6 consistent with the principles of the invention.

FIG. 10 is a block diagram of an embodiment of an output circuit or Tx stage 614 of FIG. 6 consistent with the principles of the invention. Tx stage 614 receives internal switch frames from the switch fabric, pulls the data out of the appropriate internal switch frames in accordance with the arbitrarily concatenated time slots created by Rx stage 610, and sends the data out on SONET frames.

Tx stage 610 is comprised of a Tx data interface (TDI) 1242, 48 FIFO buffers, FIFO #1 1228 through FIFO #48 1230, an additional pointer determining circuit or pointer generation (PTG) circuit 1432, transport overhead information module (TOI) 1234, and transmit line interface (TLI) 1238. The output of Tx stage 614 is comprised of, for example, a 16:1 output multiplexer 1240 and output interface (0/1) 1242.

TDI is comprised of FIFO's 1210, 1212, and 1214, switch frame overhead processors (SWF O/H's) 1216, 1218 and 1220, and time slot group buffers (TSGB's) 1222, 1224, and 1226. TDI 1242 receives internal frames from three 10-bit buses. The frames are first stored in FIFO's 1210, 1212, and 1214, which adjust the frames to correct timing problems caused by skew and other factors.

The internal frames are transferred from FIFO's 1210, 1212, and 1214, to SWF O/H's 1216, 1218 and 1220, which process the internal switch frames. Internal switch frames are comprised of alternating TSG's and processor communication channels (PCC's). Each TSG comprises a group of eighteen time slots, for example, with one byte of data transmitted per time slot. The PCC's are passed from switch controller 510 through the framer to the switch elements. For example, commands may be sent by switch controller 510 to the switch elements over PCC's. Responses and error notifications are sent by the switch elements back to the host over the PCC's. Each PCC consists of five five-byte subfields which are interleaved with data bytes. Each internal switch frame also includes idle bytes 320 that are inserted between switch frames to align them on system-dictated switch frame boundaries and to synchronize clocks in the system.

SWF O/H's 1216, 1218 and 1220, process the internal switch frames by pulling out the transport overhead information, PCC's, and TSG's from the internal switch frames. SWF O/H's 1216, 1218 and 1220, transfer the TSG's to TSGB's 1222, 1224, and 1226. The TSG's are then multiplexed from TSGB's 1222, 1224, and 1226 onto a 32-bit data bus, to 48 FIFO's, FIFO #1 1228 to FIFO #48 1230. The 48 FIFO's store the payload to be loaded into outgoing SONET frames.

The 48 FIFO's transfer the SONET payload data to PTG 1232. PTG 1232 operates similar to RPI 814 in Rx stage 610. More particularly, PTG 1232 performs pointer generation for the outgoing frames in accordance with data originating in switch controller 510 and stored in memory 1235. PTG 1232 multiplexes the payloads over a 32-bit bus to TOM 1236. TOM 1236 also receives transport overhead information from TOI 1234 over another 32-bit bus, for example, and combines the payloads from PTG 1232 and the transport overhead information from TOI for transfer to TLI 1238. TLI 1238 transfers the data over a 16-bit bus to the output of the framer, comprised of 16:1 multiplexer 1240 and 0/11242.

FIG. 11 is a block diagram illustrating memory 1235 in greater detail. Memory 1235 maps parent-child relationships for STS-1's, and is used by PTG 1232 in processing the payloads for output. Memory table 1235 includes 48 entries, respectively corresponding to 48 STS-1's as required by a SONET OC-48 frame, for example. The table includes a first submemory having concatenation indicators (CAT_IND) and a second sub-memory storing STS identifiers (STS_ID). The concatenation indication field indicates whether the corresponding STS-1 is a parent or child, marked by 0 and 1, respectively. The STS-ID field contains parent STS-1 ID's for children STS-1's.

PTG 1232 uses table 1310 to determine which FIFO's are to be concatenated. For example, based on table 1310, PTG 1232 determines that payloads in FIFO's #0, #4, and #6 are to be concatenated. FIFO's #4 and #6 are children of parent payload in FIFO #0, as indicated by the 0 in each of the STS_ID's for STS-1's #4 and #6.

Figure 12:
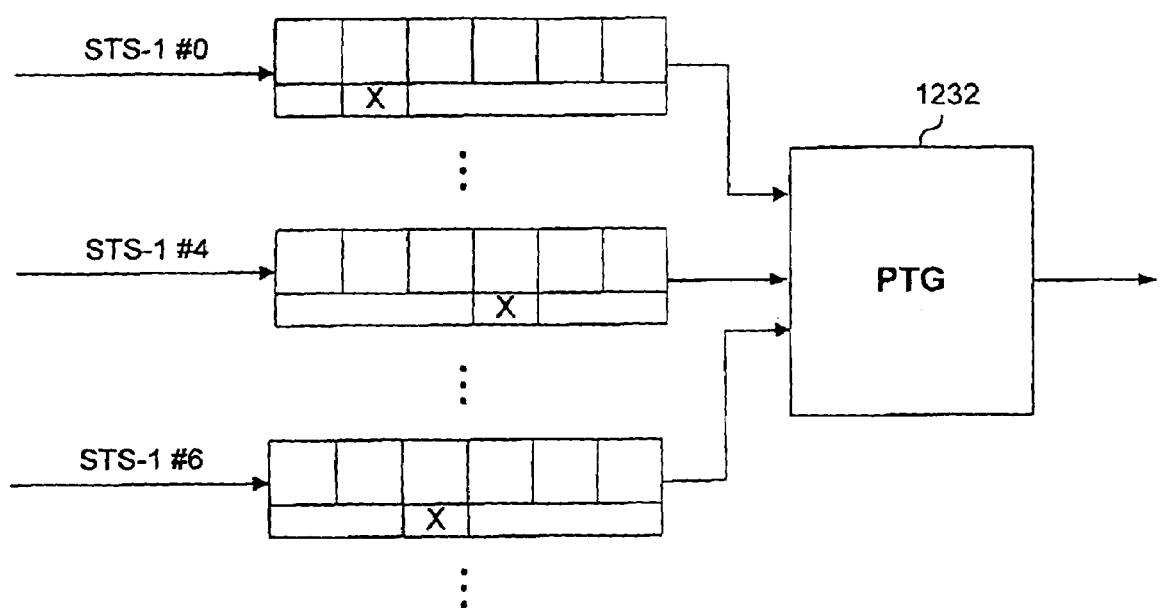
FIG. 12 illustrates payloads starting at different points in each FIFO.

FIG. 12 illustrates payloads starting at different points in each FIFO. The payload information moving through each FIFO includes data identifying where payloads stop and start based on the pointer. For purposes of illustration, X's in the FIFO's mark where a new payload starts. For example, FIG. 12 illustrates three FIFO's corresponding to three concatenated STS-1's, namely, STS-1#0, STS-1#4, and STS-1 #6. The STS-1 payload is to be concatenated with the STS-1 payloads in FIFO's #4 and #6. Each payload, however, starts at a different location of the respective FIFO, as indicated by the X's.

PTG 1232 aligns these concatenated payloads so that each outgoing SONET frame of a series of concatenated frames has the same pointer value in the transport overhead; otherwise, the payloads of the concatenated time slots cannot be properly read downstream from the switch. The pointer values are also used by PTG 1232 to perform any necessary byte stuffing.

In summary, therefore, the switch in accordance with the present invention can switch concatenated time slots even if the time slots are not supplied in a SONET-conforming sequence. As a result, complicated and time consuming reconfiguration procedures are avoided, and data fragmentation is improved.

In conclusion, systems and methods consistent with the invention provide for arbitrary concatenation of switch frames. It will be apparent to those skilled in the art that various modifications and variations can be made to the methods and apparatus for implementing arbitrary concatenation consistent with the present invention, and in construction of a network using such systems, without departing from the scope or spirit of the invention. For example, although the figures illustrate elements communicating with each other over communication paths in the form of buses and dedicated lines, it should be understood that the communications paths may take any form of communication path that is capable of transferring the required information.

Although the embodiment has been described with respect to SONET, the apparatus and methods may also be used in environments other than SONET. More particularly, methods and apparatus consistent with the invention may be used to arbitrarily concatenate switch frames or other types of information being communicated. The methods provide for both arbitrary concatenation and pointer processing of the information.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network element comprising:
an input circuit configured to receive a first plurality of N optical signal frames (N being an integer≧2) conforming to a synchronous optical network standard, said first plurality of optical signal frames being grouped into a first plurality of N time slots, at least two of said first plurality of optical signal frames being concatenated to carry a payload, the synchronous optical network standard covering optical signal frame types that are formed by concatenating at least two of the first plurality of optical signal frames;
a switch circuit coupled to said input circuit, said switch circuit being configured to receive data corresponding to said payload; and
an output circuit coupled to said switch circuit, said output circuit being configured to output a second plurality of N optical signal frames conforming to said synchronous optical network standard in response to said first plurality of optical signal frames, said second plurality of optical signal frames being grouped into a second plurality of N time slots, at least two of said second plurality of optical signal frames being concatenated to carry a payload, the synchronous optical network standard covering optical signal frame types that are formed by concatenating at least two of the second plurality of optical signal frames,
wherein a sequential placement of time slots occupied by said concatenated optical signal frames within at least one of said first and second pluralities of N time slots does not conform to said synchronous optical network standard.

2. A network element in accordance with claim 1, wherein said switch circuit further comprises:
a first switch stage coupled to said input circuit; and
a second switch stage coupled to said output circuit.

3. A network element in accordance with claim 1, wherein said concatenated optical signal frames constitute at least one OC-3c.

4. A network element in accordance with claim 1, wherein said plurality of concatenated optical signal frames constitute at least one OC-12c.

5. A network element in accordance with claim 1 wherein at least one of said first and second pluralities of N optical signal frames are transmitted at an OC-48 rate.

6. A network element in accordance with claim 1, wherein
the sequential placement of time slots occupied by said concatenated signal frames within said first plurality of N times slots does not conform to said synchronous optical network standard, and
said output circuit is configured to transmit said data in conformance with said synchronous optical network protocol.

7. A network element in accordance with claim 6, wherein said input circuit comprises:
a pointer determining circuit coupled to said switch circuit and configured to provide a pointer identification for each time slot occupied by said concatenated optical signal frames, said output circuit outputting said plurality of concatenated optical signal frames in accordance with said pointer identification.

8. A network element in accordance with claim 7, further comprising:
a memory coupled to said pointer determining circuit, said memory containing information identifying said time slots occupied by said concatenated optical signal frames, said pointer determining circuit determining said pointer identification based on said information.

9. A network element in accordance with claim 8, wherein said memory comprises:
a first submemory having N storage locations, selected storage locations in said first submemory being configured to store identification information associated with a first one of said time slots occupied by said concatenated optical signal frames in said sequential placement of said first plurality of N time slots; and
a second submemory having N storage locations, selected storage locations in said second submemory being configured to store identification information associated with subsequent ones of said occupied time slots following said first one in said sequential placement of said first plurality of N time slots.

10. A network element in accordance with claim 7, further comprising:
an additional pointer determining circuit coupled to said output circuit, and configured to determine said pointer identification within each time slot occupied by said concatenated optical signal frames, said output circuit outputting said concatenated optical signal frames in accordance with said pointer identification within each of said occupied time slots; and
a memory coupled to said output circuit, said memory being configured to store said information identifying said time slots occupied by said concatenated optical signal frames, said additional pointer determining circuit detecting said pointer location based on said information.

11. A network element in accordance with claim 10, wherein said memory comprises:
a first submemory having N storage locations, selected storage locations in said first submemory being configured to store identification information associated with a first one of said time slots occupied by said concatenated optical signal fames in said sequential placement of said first plurality of N time slots; and
a second submemory having N storage locations, selected storage locations in said second memory being configured to store identification information associated with subsequent ones of said occupied time slots following said first one in said sequential placement of said first plurality of N time slots.

12. A network element in accordance with claim 10, wherein said output circuit further comprises a plurality of buffer circuits, each of said buffer circuits being configured to store a respective one of said concatenated optical signal frames, said buffer circuits outputting said concatenated optical signal frames in a synchronized manner in response to said pointer identification.

13. A network element in accordance with claim 12, wherein each of said plurality of buffer circuits comprises a first-in-first-out (FIFO) buffer.

14. A network element according to claim 1, wherein said synchronous optical network standard is SONET/SDH.

15. A network including one or more of said network elements in accordance with claim 1.

16. A switching method comprising:
supplying a first plurality of N optical signal frames (N being an integer≧2) conforming to a synchronous optical network standard, said first plurality of optical signal frames being grouped into a first plurality of N time slots, at least two of said first plurality of optical signal frames being concatenated to carry a payload, the synchronous optical network standard covering optical signal frame types that are formed by concatenating at least two of the first plurality of optical signal frames;
determining a pointer for each time slot occupied by said concatenated optical signal frames; and
outputting said concatenated optical signal frames in accordance with said pointers for said occupied time slots, said concatenated optical signal frames being output in a second plurality of N optical signal frames, said second plurality of N optical signal frames being grouped in a second plurality of N time slots, at least two of said second plurality of optical signal frames being concatenated to carry a payload, the synchronous optical network standard covering optical signal frame types that are formed by concatenating at least two of the second plurality of optical signal frames,
wherein a sequential placement of the time slots occupied by said concatenated optical signal frames within at least one of said first and second pluralities of N time slots does not conform to said synchronous optical network standard.

17. A method in accordance with claim 16, wherein said concatenated optical signal frames constitute at least one OC-3c.

18. A method in accordance with claim 16, wherein said concatenated optical signal frames constitute at least one OC-12c.

19. A method in accordance with claim 16, wherein the sequential placement of time slots occupied by said concatenated signal frames within said first plurality of N times slots does not conform to said synchronous optical network standard.

20. A method in accordance with claim 19, further comprising the step identifying said occupied time slots in said first plurality of N time slots.

21. A method in accordance with claim 20, further comprising the step of storing information corresponding to said identified time slots in a memory.

22. A method in accordance with claim 21, wherein said determining step is performed based on information corresponding to said identified time slots.

23. A method in claim 19 wherein said outputting step further comprises the step of synchronizing said concatenated optical signal frames based on said pointer of each of said occupied time slots.

24. A method in accordance with claim 19, further comprising the steps of:
   storing first identification information associated with a first one of said occupied time slots in said sequential placement of said first plurality of N time slots in a first memory; and
   storing, in a second memory, second identification information associated with selected ones of said occupied time slots following said first one of said occupied time slots in said sequential placement of said first plurality of N time slots.

25. A method in accordance with claim 24, wherein said determining step is based on said first and second identification information.

26. A method in accordance with claim 16 wherein said synchronous optical network standard is SONET/SDH.

27. A network element comprising:
   a switch configured to receive a first plurality of N optical signal frames (N being an integer≧2) conforming to a synchronous optical network standard, said first plurality of optical signal frames being grouped into a plurality of N time slots, at least two of said first plurality of optical signal frames being concatenated to carry a payload, the synchronous optical network standard covering optical signal frame types that are formed by concatenating at least two of the first plurality of optical signal frames,
   wherein a sequential placement of the time slots occupied by said concatenated optical signal frames within said plurality of N time slots does not conform to said synchronous optical network standard, said switch being further configured to output a second plurality of N optical signal frames in response to said first plurality of optical signal frames in order to transmit said payload in conformance with said synchronous optical network standard.

* * * * *